(12) United States Patent
Lin et al.

(10) Patent No.: US 11,611,388 B2
(45) Date of Patent: Mar. 21, 2023

(54) ENERGY HARVESTING RELAY COMMUNICATION METHOD AND SYSTEM

(71) Applicant: REALTEK SEMICONDUCTOR CORPORATION, Hsinchu (TW)

(72) Inventors: Jhe-Yi Lin, Hsinchu (TW); Ronald Y. Chang, Taipei (TW); Hen-Wai Tsao, Taipei (TW); Hsuan-Jung Su, Taipei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 212 days.

(21) Appl. No.: 17/123,016

(22) Filed: Dec. 15, 2020

(65) Prior Publication Data

US 2021/0226690 A1 Jul. 22, 2021

Related U.S. Application Data

(60) Provisional application No. 62/964,129, filed on Jan. 22, 2020.

(51) Int. Cl.
*H04B 7/15* (2006.01)
*H04B 7/155* (2006.01)

(52) U.S. Cl.
CPC ..... *H04B 7/15578* (2013.01); *H04B 7/15535* (2013.01); *H04B 7/15592* (2013.01)

(58) Field of Classification Search
CPC ........ H04B 7/14; H04B 7/15; H04B 7/15535; H04B 7/15578; H04B 7/15592; H04B 7/155
See application file for complete search history.

(56) References Cited

U.S. PATENT DOCUMENTS

| | | | |
|---|---|---|---|
| 10,361,596 B1* | 7/2019 | Al-Habob | H02J 50/50 |
| 11,114,899 B2* | 9/2021 | Prakriya | H02J 50/50 |
| 2017/0310380 A1* | 10/2017 | Kim | H04L 5/14 |

FOREIGN PATENT DOCUMENTS

| | | | | |
|---|---|---|---|---|
| CN | 103117835 A | | 5/2013 | |
| CN | 102983878 B | | 12/2015 | |
| CN | 105610485 A | | 5/2016 | |
| CN | 105848245 A | * | 8/2016 | |
| CN | 106656379 A | * | 5/2017 | ........... H04B 17/327 |
| CN | 107317618 A | * | 11/2017 | ......... H04B 7/15528 |

OTHER PUBLICATIONS

English Abstracts of CN105610485A, CN103117835A and CN102983878B.

(Continued)

*Primary Examiner* — Blane J Jackson
(74) *Attorney, Agent, or Firm* — WPAT, P.C., Intellectual Property Attorneys; Anthony King

(57) ABSTRACT

The application discloses a method applied in a system. The method includes the following operations: determining a first statistics of a first signal and a second statistics of a second signal according to a power split ratio and a noise level of a relay node; relaying, by the relay node, the first signal according to the power split ratio, the first statistics and the second statistics to generate the second signal; and receiving, by a destination node, the second signal.

20 Claims, 4 Drawing Sheets

(56) References Cited

OTHER PUBLICATIONS

T. Riihonen, S. Werner, and R. Wichman, "Mitigation of loopback self-interference in full-duplex MIMO relays," IEEE Trans. Signal Process., Dec. 2011, pp. 5983-5993, vol. 59, No. 12.
Y. Zeng and R. Zhang, "Full-duplex wireless-powered relay with self-energy recycling," IEEE Wireless Commun. Lett., Apr. 2015, pp. 201-204, vol. 4, No. 2.
C. Zhong, H.A. Suraweera, G. Zheng, I. Krikidis, and Z. Zhang, "Wireless information and power transfer with full duplex relaying," IEEE Trans. Commun., Oct. 2014, pp. 3447-3467, vol. 62, No. 10.
D. Wang, R. Zhzng, X. Cheng, and L. Yang, "Capacity-enhancing full-duplex relay networks based on power-splitting (PS-)SWIPT," IEEE Trans. Veh. Technol., Jun. 2017, pp. 5445-5450, vol. 66, No. 6.
H. Liu, K J. Kim, K. S. Kwak, and H. V. Poor, "Power splitting-based SWIPT with decode-and-forward full-duplex relaying," IEEE Trans, Wireless Commun., Nov. 2016, pp. 7561-7577, vol. 15, No. 11.
Y. Zeng, C. M. Yetis, E. Gunawan, Y. L. Guan, and R. Zhang, "Transmit optimization with improper Gaussian signaling for interference channels," IEEE Trans. Signal Process., Jun. 2013, pp. 2899-2913, vol. 61, No. 11.
J.-Y. Lin, R. Y. Chang, C.-H. Lee, H.-W. Tsao, and H.-J. Su, "Multi-agent distributed beamforming with improper Gaussian signaling for MIMO interference broadcast channels," IEEE Trans. Wireless Commun., Jan. 2019, pp. 136-151, vol. 18, No. 1.
M. Gaafar, O. Amin, W. Abediseid, and M.-S. Alouini, "Underlay spectrum sharing techniques with in-band full-duplex systems using improper Gaussian signaling," IEEE Trans. Wireless Commun., Jan. 2017, pp. 235-249, vol. 16, No. 1.
M. Gaafar, M. G. Khafagy, O. Amin, and M.-S. Alouini, "Improper Gaussian signaling in full-duplex relay channels with residual self-interference," in Proc. IEEE Int. Conf. Commun. (ICC,)May 2016, pp. 1-7.
I. Santamaria, P. M. Crespo, C. Lameiro, and P. J. Schreier, "Information-theoretic analysis of a family of improper discrete constellations," Entropy, Jan. 2018, p. 45, vol. 20, No. 1.
S. Javed, O. Amin, B. Shihada, and M.-S. Alouini, "Improper gaussian signaling for hardware impaired multihop full-dupelx relaying systems," IEEE Trans. Commun., Mar. 2018, pp. 1858-1871, vol. 67, No. 3.
P. J. Schreier and L. L. Scharf, Statistical Signal Processing of Complex-valued Data: The Theory of Improper and Noncircular Signals, 2010, Cambridge University.
Z. Zhang, X. Chai, K. Long, A. V. Vasilakos, and L. Hanzo, "Full duplex techniques for 5G networks: self-nterference cancellation protocol design, and relay selection," IEEE Commun. Mag., May 2015, pp. 128-137, vol. 53, No. 5.
J. C. Bezdek and R. J. Hathaway, "Convergence of alternating optimization," Neural, Parallel & Computations, Dec. 2003, pp. 351-368, vol. 11, No. 4.

\* cited by examiner

ENERGY HARVESTING RELAY COMMUNICATION METHOD AND SYSTEM

CROSS REFERENCE TO RELATED APPLICATIONS

This application claims the benefit of prior-filed provisional application with application No. 62/964,129, filed Jan. 22, 2020, which is incorporated by reference in its entirety.

BACKGROUND

Field of the Invention

The present disclosure relates to a communication method; in particular, to a communication method by using an energy harvesting-enabled relay system for mitigating the interference.

Description of Related Art

In some relaying communication applications, the loop interference (LI) is the main performance-limiting factor. The higher the LI is, the lower the power of the signal can be transmitted to the destination. Therefore, the ability of loop interference resistance of a relaying communication system becomes an important characteristic in this field.

BRIEF SUMMARY OF THE INVENTION

Some embodiments of the present disclosure provide a method which includes the following operations: determining a first statistics of a first signal and a second statistics of a second signal according to a power split ratio and a noise level of a relay node; relaying, by the relay node, the first signal according to the power split ratio, the first statistics and the second statistics to generate the second signal; and receiving, by a destination node, the second signal.

Some embodiments of the present disclosure provide a system which includes a source node, a relay node, and a destination node. The relay node is configured to split a first signal having a first statistics according to a power split ratio, and generate a second signal having a second statistics according to the first signal. The source node is configured to determine the first statistics and the second statistics according to the power split ratio.

The present communication method and system are able to amplify the loop interference resistance in relaying communication system.

BRIEF DESCRIPTION OF THE DRAWINGS

Aspects of the present disclosure are best understood from the following detailed description when read with the accompanying figures. It should be noted that, in accordance with the standard practice in the field, various features are not drawn to scale. In fact, the dimensions of the various features may be arbitrarily increased or reduced for clarity of discussion.

DETAILED DESCRIPTION

Figure 1:
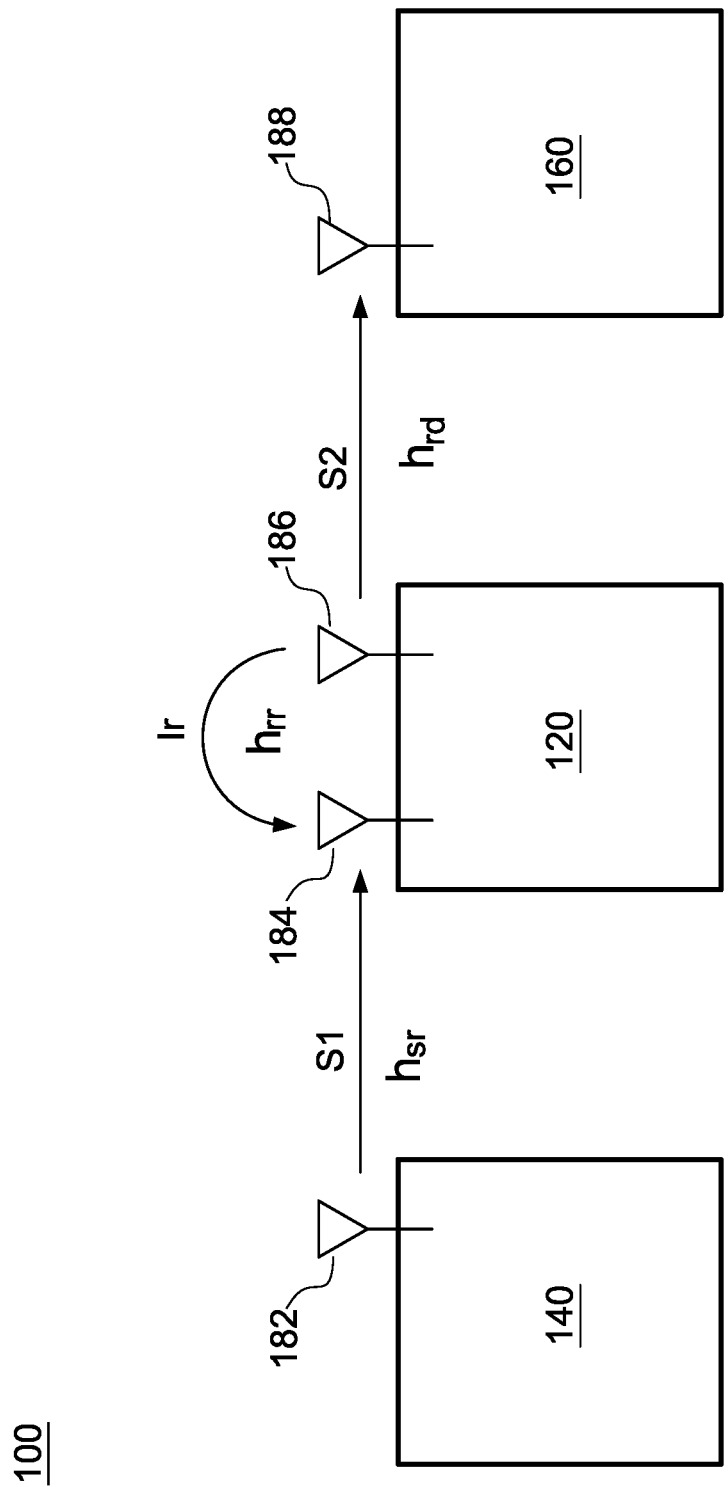
FIG. 1 is a schematic diagram of a system according to some embodiments of the present disclosure.

Reference is made to FIG. 1. A system 100 is a full-duplex wireless relaying communication system which includes a relay node 120 configured to receive and retransmit signal wirelessly. The relay node 120 receives a signal S1 from a source node 140 and emits a transmission signal to the destination node 160. However, only a portion (i.e. a signal S2) of the transmission signal can be received by the destination node 160. Another portion (i.e. a noise Ir) of the transmission signal may be received by the relay node 120 itself.

The source node 140 encodes information to generate the signal S1, and the destination node 160 decodes the received signal S2. The performance of the system 100 is associated with a ratio of a power $P_2$ of the signal S2 to a power $P_1$ of the signal S1. The more the ratio of $P_2$ to $P_1$ increases, the better performance the system 100 has. In this embodiment, the relay node 120 is not powered by an external power source. Thus, the total power of the signal S2 and noise Ir are constant due to the conversation of energy. The relay node 120 consumes a portion of the power $P_1$ to generate the signal S2. However, the relay node 120 is also able to reuse a portion of the power of the noise Ir which returns to relay node 120. Under such condition, the system 100 of present disclosure is configured to optimize the power distributed to the signal S2 and the noise Ir in order to achieve a desired performance of the signal communication.

In the system 100, the signals are communicated wirelessly via antennae 182, 184, 186 and 188 between nodes 140, 120 and 160. Therefore, loss exists when the signals are transmitted, in which $h_{sr}$, $h_{rd}$, and $h_{rr}$ denote channel coefficients from the source node 140 to the relay node 120, from the relay node 120 to the destination node 160, and from the relay node 120 returning to the relay node 120, respectively. A coupling loss $h_{rr}^2$ (the channel gain of the path from the antenna 186 to the antenna 184) is also referred to as loop interference (LI).

Figure 2:
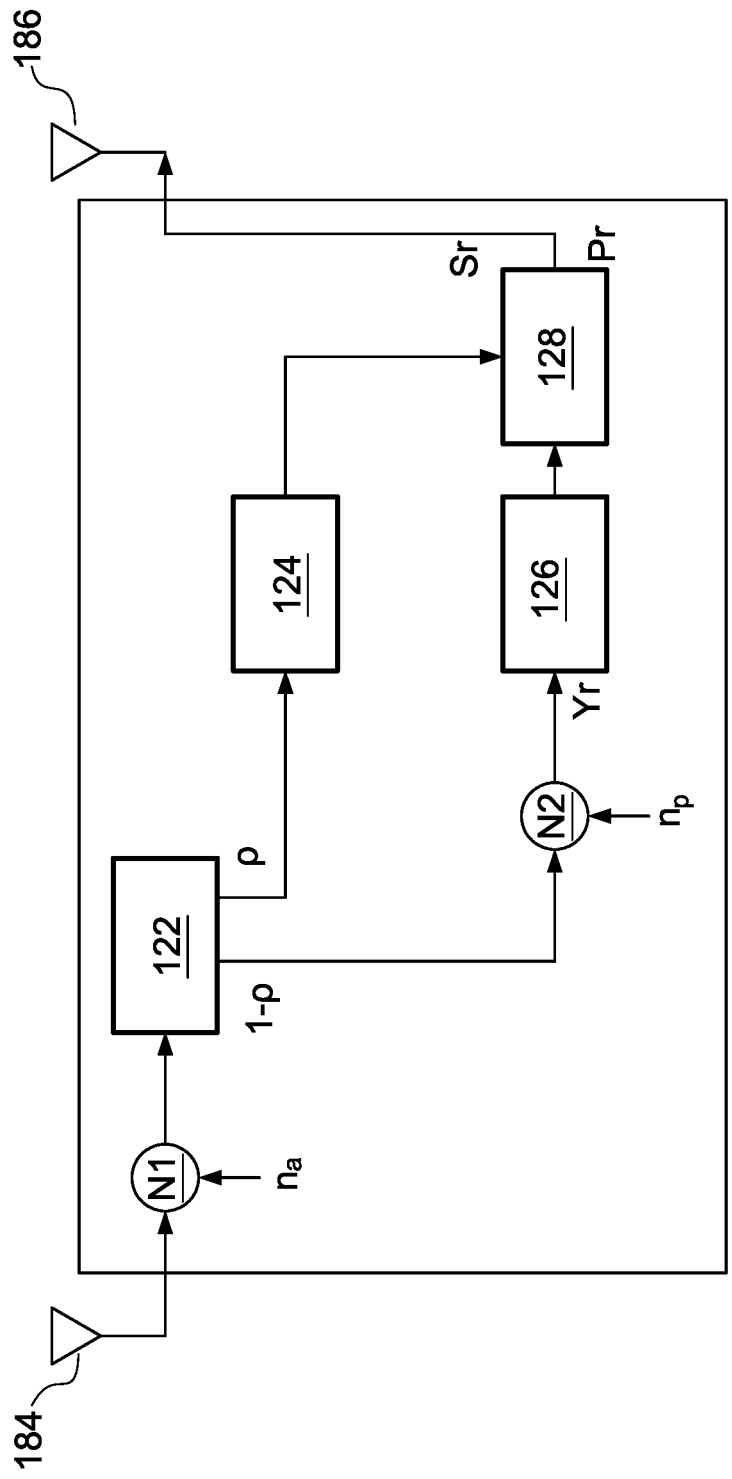
FIG. 2 is a schematic diagram of a relay node of the system shown in FIG. 1 according to some embodiments of the present disclosure.

Reference is made to FIG. 2. The relay node 120 applies an energy harvesting (EH) decode-and-forward (DF) configuration and includes a power split device 122, an EH device 124, an information decoding (ID) device 126, and an amplifier 128.

Referring to FIG. 2, a noise $n_a$ is incorporated into the signal S1 at a node N1 to model the antenna noise introduced when the relay node 120 using the antenna 184 to receive the signal S1. The signal S1 with the noise $n_a$ is split by the power split device 122 into an EH portion and an information portion according to a power split ratio $\rho$ configured in the power split device 122, wherein the power split ratio $\rho$ equals a ratio of the power of the EH portion to the power $P_1$. In other words, a ratio of the power of the information portion to the power $P_1$ equals $(1-\rho)$.

A noise $n_p$ is incorporated into the information portion at a node N2 to model the processing noise occurred within the relay node 120. The information portion with the noise $n_p$, denoted as a signal Yr, is decoded by the ID device 126 and then amplified by the amplifier 128.

In another path outwards the power split device 122, energy of the EH portion is harvested by the EH device 124.

To put it more specifically, the EH device 124 receives the EH portion and uses it to produce an EH power, and supplies the EH power to the amplifier 128. The EH power is the power consumed by the amplifier 128 when performing amplification on the decoded information portion to generate a signal Sr. The signal Sr is then transmitted through the antenna 186 as the signal S2 to the destination node 160 with the accompanying noise Ir back to the relay node 120 via the antenna 184. The ratio of the noise Ir to the signal Sr is associated with an attenuation factor $\mu$ ranged from 0 to 1. More specifically, the attenuation factor $\mu$ equals a ratio of the power of the noise Ir to the power of the signal Sr.

In the system 100, the signal S1 and the signal S2 may be modeled as complex random variables, and have variances $C_{S1}$, $C_{S2}$ and pseudo-variances $\widetilde{C_{S1}}, \widetilde{C_{S2}}$. In this embodiment, the signal S1 and the signal S2 are represented as improper Gaussian signals (IGS), and the pseudo-variances $\widetilde{C_{S1}}$ and $\widetilde{C_{S2}}$ are not equal to zero. In addition, for example of the signal S1, a variable $\underline{C}_{S1}$ is represented as follow:

$$\underline{C}_{S1} = \begin{bmatrix} C_{S1} & \widetilde{C_{S1}} \\ \widetilde{C_{S1}}^* & C_{S1}^* \end{bmatrix} \quad (\text{Eq. 1})$$

and the variable $\underline{C}_{S1}$ follows a condition that there exists a signal S1 having the variance $\underline{C}_{S1}$ and pseudo-variance $\widetilde{C_{S1}}$, if and only if the variable $\underline{C}_{S1}$ is a positive semidefinite (PSD). Therefore, when a pair of the variance and the pseudo-variance is found, the corresponded complex random variable must exist and can be obtained.

An achievable rate $R_{e2e}$ is defined as a throughput of the system 100 from the source node 140 to the destination node 160, and can be expressed associated with the pseudo-variance $\widetilde{C_{S1}}$ an the pseudo-variance $\widetilde{C_{S2}}$. Based on the Eq. 1 and the condition which Eq. 1 follows, the signal S1 and signal S2 can be obtained by obtaining the variance $C_{S1}$, variance $C_{S2}$, pseudo-variance $\widetilde{C_{S1}}$, and pseudo-variance $\widetilde{C_{S2}}$.

In the present disclosure, the achievable rate $R_{e2e}$ indicates the performance of the system 100. Furthermore, the signal S1 and the signal S2 are IGS, so as to make the achievable rate $R_{e2e}$ become a closed form and solvable. Therefore, an optimum of the achievable rate $R_{e2e}$ is able to be obtained. In order to obtain the optimum of the achievable rate $R_{e2e}$, the pseudo-variance $\widetilde{C_{S1}}$ and the pseudo-variance $\widetilde{C_{S2}}$ are optimized to realize the optimization of the achievable rate $R_{e2e}$, and the corresponded signals S1 and S2 can be generated. Please see the following description for details.

Figure 3:
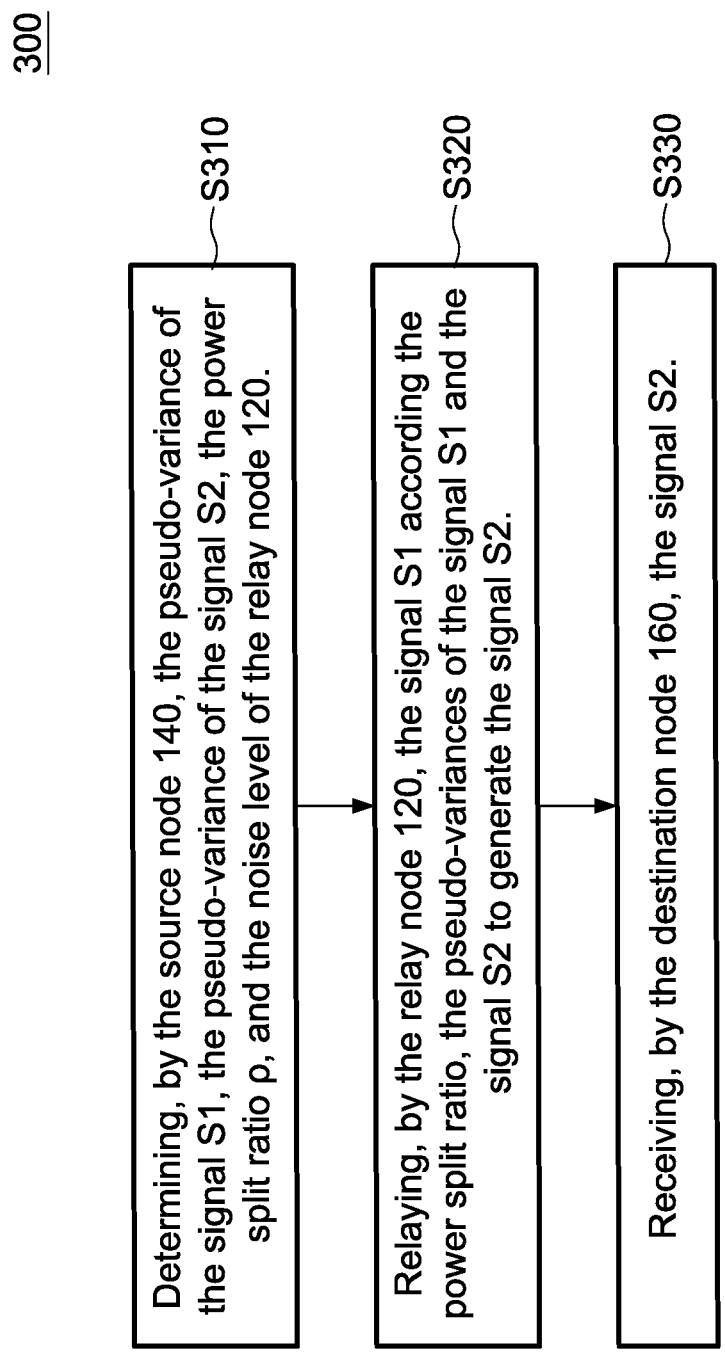
FIG. 3 is a flowchart of a method for operating the system shown in FIG. 1 according to some embodiments of the present disclosure.

Reference is made to FIG. 3. A communication method 300 applied by the system 100 includes operations S310, S320, and S330. In operation S310, the source node 140 determines the pseudo-variance $\widetilde{C_{S1}}$, the pseudo-variance $\widetilde{C_{S2}}$, the power split ratio $\rho$, and a noise level of the relay node 120 to generate the signal S1. In operation S320, the relay node 120 relays the signal S according to the pseudo-variance $\widetilde{C_{S1}}$, the pseudo-variance $\widetilde{C_{S2}}$, and the power split ratio $\rho$ so as to generate the signal S2. In operation S330, the destination node 160 receives the signal S2.

Please refer to FIG. 1 and FIG. 2 again. According to the channel coefficients $h_{sr}$ and $h_{rr}$, the power split ratio $\rho$, and the noise $n_a$ and $n_p$, the signal Yr can be expressed as the following equation:

$$Yr=\sqrt{(1-\rho)P_1}h_{sr}S1+\sqrt{(1-\rho)P_1}\mu h_{rr}Sr+n_r \quad (\text{Eq. 2})$$

in which the $P_r$ indicates the power of the signal Yr. In some embodiments, the noise $n_r$ is an independent and identically distributed (i.i.d.) circular symmetric complex Gaussian (CGCS) noise. The noise $n_r$ includes the noise $n_a$ and the noise $n_p$, and can be expressed as following equation:

$$n_r=\sqrt{1-\rho}n_a+n_p \quad (\text{Eq. 3})$$

in which the noise $n_r$ has a noise level $\sigma_r^2$. Furthermore, an interference-plus noise Ir' can be given by:

$$Ir'=\sqrt{(1-\rho)P_1}\mu h_{rr}Sr+n_r=\sqrt{(1-\rho)P_1}h_{rr}Ir+n_r \quad (\text{Eq. 4}).$$

The noise Ir' is contributed by the returned noise Ir, and the noise Ir' is a noise portion in the signal Yr.

An achievable rate $R_{sr}$ from the source node 140 to the relay node 120 is associated with a ratio of the signal Yr to the signal Ir, and can be expressed as follow:

$$R_{sr} = \log_2\left(\frac{H^T \cdot Yr}{H^T \cdot Ir}\right) = R_{sr}(\rho, \widetilde{C_{S1}}, \widetilde{C_{S2}}, \sigma_r). \quad (\text{Eq. 5})$$

According to the coupling loss $h_{rd}$, the signal S2 can be expressed as the following equation:

$$S2=\sqrt{P_r}h_{rd}Sr+n_d \quad (\text{Eq. 6})$$

in which the $n_d$ indicates the noise at the destination node 160. Similarly, an achievable rate $R_{rd}$ from the relay node 120 to the destination node 160 is associated with a ratio of the signal S2 to the noise $n_d$.

$$R_{rd} = \log_2\left(\frac{H^T \cdot S2}{H^T \cdot n_d}\right) = R_{rd}(\rho, \widetilde{C_{S1}}, \widetilde{C_{S2}}, \sigma_r). \quad (\text{Eq. 7})$$

The achievable rate $R_{e2e}$ can be obtained by selecting the minimum of the achievable rate $R_{sr}$ and the achievable rate $R_{rd}$, and can be expressed as follow:

$$R_{e2e}=\min(R_{sr},R_{rd}) \quad (\text{Eq. 8}).$$

Eq. 8 includes the parameters of the power split ratio $\rho$, thus the achievable rate $R_{e2e}$ has a constraint which can be expressed as follow.

$$0 \leq \rho \leq \rho_{max} \quad (\text{Eq. 9}).$$

The power split ratio $\rho$ indicates the ratio divided from the power $P_1$, therefore, the $\rho_{max}$ is equal to or less than 1.

According to Eq. 1, Eq. 8, and Eq. 9, an alternating optimization (AO) algorithm is performed to solve the solution of the Eq. 8. Based on the condition of Eq. 1 and the constraint of Eq. 9, the Eq. 8 can be divided to three subproblems which correspond to the parameters of $\rho$, $\{\widetilde{C_{S1}}, \widetilde{C_{S2}}\}$, and $\sigma_r$, respectively. The Eq. 8 is solved by solving each subproblem individually. When the three subproblems are solved, the parameters of $\{\widetilde{C_{S1}}, \widetilde{C_{S2}}\}$ in each subproblem are compared to determine whether the solution is obtained.

Figure 4:
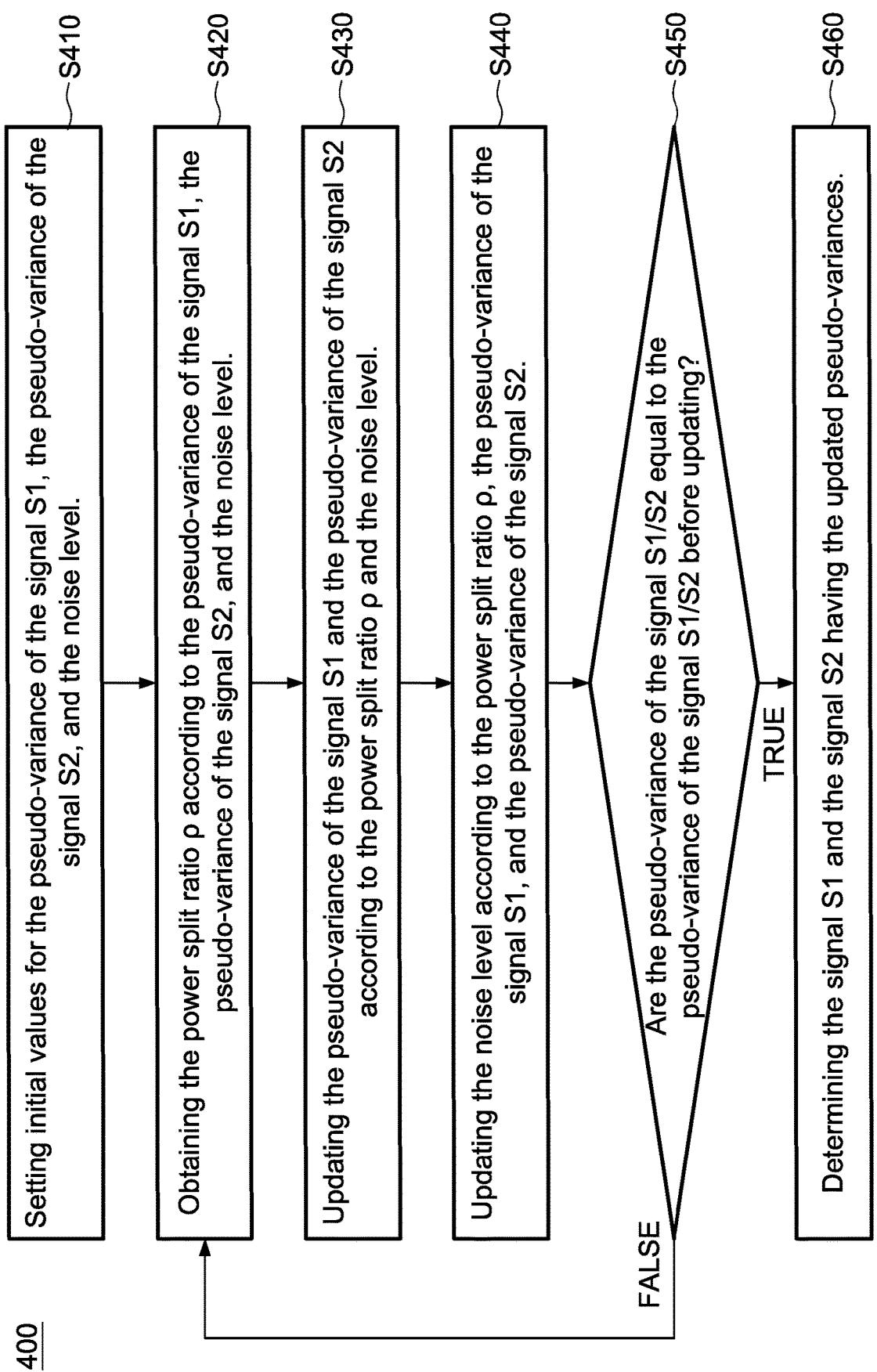
FIG. 4 is a flowchart of a method for operating the system shown in FIG. 1 according to other embodiments of the present disclosure.

Please refer to FIG. 4. A method 400 including operations S410-S460 is illustrated to detail the operation A310, and the method 400 is performed by the source node 140.

Before solving the subproblems, an initial value of the pseudo-variance $\widetilde{C_{S1}}$, an initial value of the pseudo-variance $\widetilde{C_{S2}}$, and an initial value of the noise level $\sigma_r^2$ are set as constants (S410). For example, the initial values of the pseudo-variance $\widetilde{C_{S1}}$, the pseudo-variance $\widetilde{C_{S2}}$, and the noise level $\sigma_r^2$ are set as 0.

After the pseudo-variance $\widetilde{C_{S1}}$, the pseudo-variance $\widetilde{C_{S2}}$, and the noise level $\sigma_r^2$ are set as constants, the power split ratio $\rho$ can be obtained by solving the Eq. 8 (S420). Next, the pseudo-variance $\widetilde{C_{S1}}$ and the pseudo-variance $\widetilde{C_{S2}}$ are updated according to the power split ratio ρ and the noise level $\sigma_r^2$ (S430). More specifically, the power split ratio ρ and the noise level $\sigma_r^2$ are treated as constants, and the pseudo-variance $\widetilde{C_{S_1}}$ and the pseudo-variance $\widetilde{C_{S_2}}$ are obtained by solving the Eq. 8. After that, the noise level $\sigma_r^2$ is updated according to the pseudo-variance $\widetilde{C_{S_1}}$, the pseudo-variance $\widetilde{C_{S_2}}$, and the power split ratio ρ (S440). Similarly, the pseudo-variance $\widetilde{C_{S_1}}$, the pseudo-variance $\widetilde{C_{S_2}}$, and the power split ratio ρ are treated as constants; the noise level $\sigma_r^2$ is obtained by solving the Eq. 8.

After performing the first iteration of the operations S420-S440, the updated pseudo-variance $\widetilde{C_{S_1}}$ and the pseudo-variance $\widetilde{C_{S_2}}$ are compared to the pseudo-variance $\widetilde{C_{S_1}}$ and the pseudo-variance $\widetilde{C_{S_2}}$ before updating, respectively (S450). When the updated pseudo-variance $\widetilde{C_{S_1}}$ is not equal to the pseudo-variance $\widetilde{C_{S_1}}$ before updating or when the updated pseudo-variance $\widetilde{C_{S_2}}$ is not equal to the pseudo-variance $\widetilde{C_{S_2}}$ before updating, the method 400 goes back to the operation S420, and a next iteration of the operations S420-S440 is performed.

When the updated pseudo-variance $\widetilde{C_{S_1}}$ is equal to the pseudo-variance $\widetilde{C_{S_1}}$ before updating and when the updated pseudo-variance $\widetilde{C_{S_2}}$ is equal to the pseudo-variance $\widetilde{C_{S_2}}$ before updating, the signal S1 and the signal S2 are determined to have the latest pseudo-variance $\widetilde{C_{S_1}}$ and the latest pseudo-variance $\widetilde{C_{S_2}}$, respectively (S460).

In some embodiments, the system 100 has a maximum number limiting the iteration number of the method 400. When the iteration number reaches the maximum number, whether the operation S450 is "TRUE" or "FALSE", the method 400 goes to operation S460.

In other embodiments, when performing the operations S410-S440, the parameters of ρ, $\{\widetilde{C_{S_1}}, \widetilde{C_{S_2}}\}$, and $\sigma_r^2$ are switchable. For example, in the operation S410, the initial value of ρ and $\{\widetilde{C_{S_1}}, \widetilde{C_{S_2}}\}$ are set as constants, and the noise level $\sigma_r^2$ is obtained according to ρ and $\{\widetilde{C_{S_1}}, \widetilde{C_{S_2}}\}$ in the operation S420. The initial values of $\{\widetilde{C_{S_1}}, \widetilde{C_{S_2}}\}$ are set as 0, and the power split ratio ρ is set as 0.5. Next, ρ and $\{\widetilde{C_{S_1}}, \widetilde{C_{S_2}}\}$ are updated in the following operations S430-S440.

After the pseudo-variance $\widetilde{C_{S_1}}$ and the pseudo-variance $\widetilde{C_{S_2}}$ are determined, the signal S1 and the signal S2 can be determined according the condition which Eq. 1 follows. The source node 140 generates the signal S1 having the determined pseudo-variance $\widetilde{C_{S_1}}$, and the relay node 120 relays the signal S1 to generate the signal S2 having the determined pseudo-variance $\widetilde{C_{S_2}}$.

In conclusion, under the premise of the attenuation factor μ being a constant, the method 400 is applied to calculate the second order statistics ($\widetilde{C_{S_1}}, \widetilde{C_{S_2}}$), of the signal S1 and the signal S2, the power split ratio ρ, and the noise level $\sigma_r^2$. Then, the system 100 manipulates the source node 140 and the relay node 120 to have the signal S1 and the signal S2 as desired IGS according to the calculated parameters $\widetilde{C_{S_1}}$, $\widetilde{C_{S_2}}$, ρ, and $\sigma_r^2$, in order to obtain the highest achievable rate $R_{e2e}$. As known in the art, the achievable rate $R_{e2e}$ is an important indicator for evaluating the system 100. Therefore, the performance of the system 100 improves, and the LI resistance increases as well.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A method, comprising:
   determining a first statistics of a first signal and a second statistics of a second signal according to a power split ratio and a noise level of a relay node, wherein the first statistic is a pseudo-variance of the first signal, and the second statistic is a pseudo-variance of the second signal;
   relaying, by the relay node, the first signal according to the power split ratio, the first statistics and the second statistics to generate the second signal; and
   receiving, by a destination node, the second signal.

2. The method of claim 1, wherein determining the first statistics and the second statistics according to the power split ratio and the noise level comprises:
   obtaining the power split ratio according to the first statistics, the second statistics, and the noise level;
   updating the first statistics and the second statistics according to the power split ratio and the noise level; and
   updating the noise level according to the updated first statistics, the updated second statistics, and the power split ratio.

3. The method of claim 2, wherein determining the first statistics and the second statistics according to the power split ratio and the noise level further comprises:
   before obtaining the power split ratio, setting a first initial value for the first statistics, a second initial value for the second statistics, and a third initial value for the noise level.

4. The method of claim 2, wherein determining the first statistics and the second statistics according to the power split ratio and the noise level further comprises:
   when the updated first statistics is not equal to the first statistics before updating or the updated second statistics is not equal to the second statistics before updating, performing the operations of obtaining the power split ratio, updating the first statistics and the second statistics, and updating the noise level again.

5. The method of claim 2, wherein determining the first statistics and the second statistics according to the power split ratio and the noise level further comprises:
   when the updated first statistics is equal to the first statistics before updating and the updated second statistics is equal to the second statistics before updating, determining the first signal having the updated first statistics and the second signal having the updated second statistics.

6. The method of claim 1, wherein the first signal and the second signal are improper Gaussian signals.

7. The method of claim 1, wherein the noise level is associated with an independent and identically distributed (i.i.d.) circular symmetric complex Gaussian (CSCG) noise of the relay node.

8. The method of claim 7, wherein the i.i.d. CSCG noise comprises a noise of an antenna of the relay node and a processing noise of the relay node.

9. The method of claim 1, wherein relaying the first signal comprises:
   splitting, by a power split device, the first signal as an energy-harvesting portion and an information portion according to the power split ratio;

decoding, by an information decoding device, the information portion of the first signal; and
amplifying, by using a power of the energy-harvesting portion of the first signal, the decoded information portion of first signal, to generate the second signal.

10. The method of claim 1, further comprising:
transmitting, by a source node, the first signal having the first statistics to the relay node,
wherein determining the first statistics and the second statistics is performed by the source node.

11. A system, comprising:
a source node;
a relay node configured to split a first signal having a first statistics according to a power split ratio, and generate a second signal having a second statistics according to the first signal; and
a destination node configured to receive the second signal,
wherein the source node is configured to determine the first statistics and the second statistics according to the power split ratio.

12. The system of claim 11, the source node is further configured to:
obtain the power split ratio according to the first statistics, the second statistics, and a noise level of the relay node;
update the first statistics and the second statistics according to the power split ratio and the noise level; and
update the noise level according to the updated first statistics, the updated second statistics, and the power split ratio.

13. The system of claim 12, wherein when the updated first statistics is equal to the first statistics before updating and the updated second statistics is equal to the second statistics before updating, the source node is further configured to generate the first signal having the updated first statistics.

14. The system of claim 12, wherein when the updated first statistics is not equal to the first statistics before updating or the updated second statistics is not equal to the second statistics before updating, the source node is further configured to obtain the power split ratio, update the first statistics and the second statistics, and update the noise level again.

15. The system of claim 12, wherein the source node is further configured to set a first initial value for the first statistics, a second initial value for the second statistics, and a third initial value for the noise level.

16. The system of claim 12, wherein the noise level is associated with an independent and identically distributed (i.i.d.) circular symmetric complex Gaussian (CSCG) noise of the relay node.

17. The system of claim 16, wherein the i.i.d. CGCS noise comprises a noise of an antenna of the relay node and a processing noise of the relay node.

18. The system of claim 11, wherein the relay node comprises:
a power split device configured to split the first signal to a first portion and a second portion;
an energy-harvesting device configured to harvest a power of the first portion;
an information decoding device configured to decode the second portion; and
an amplifier configured to amplify the decoded second portion by using the power of the first portion, to generate the second signal.

19. The system of claim 11, wherein the first statistics is a pseudo-variance of the first signal and the second statistics is a pseudo-variance of the second signal, and the first signal and the second signal are improper Gaussian signals.

20. The system of claim 11, wherein the source node is configured to determine the first statistics and the second statistics according to the power split ratio and a noise level of the relay node, in order to generate the first signal having the first statistics.

* * * * *